United States Patent [19]

Cohen

[11] Patent Number: 5,752,051
[45] Date of Patent: May 12, 1998

[54] LANGUAGE-INDEPENDENT METHOD OF GENERATING INDEX TERMS

[75] Inventor: Jonathan Drew Cohen, Hanover, Md.

[73] Assignee: The United States of America as represented by the Secretary of NSA, Washington, D.C.

[21] Appl. No.: 277,052

[22] Filed: Jul. 19, 1994

[51] Int. Cl.$^6$ .................................................. G06F 17/21
[52] U.S. Cl. ........................ 395/751; 395/613; 395/759
[58] Field of Search .............................. 395/600, 183.14, 395/601, 613, 602, 611, 364, 419, 751, 759, 761; 364/419.19, 419.01, 419.08

[56] References Cited

U.S. PATENT DOCUMENTS

| 5,062,143 | 10/1991 | Schmitt | 382/36 |
| 5,418,951 | 5/1995 | Danashek . | |
| 5,452,442 | 9/1995 | Kephart | 395/183.14 |

OTHER PUBLICATIONS

Willett, Document Retrieval Experiments Using Indexing Vocabularies of Varying Size, Dec. 1979, Journal of Documentation II, vol. 35 No. 4 pp. 296–305.

Burnett et al., Document Retrieval Experiments Using Indexing Vocabularies of Varying Size. I., Sep. 1979, Journal of Documentation, vol. 35, No. 3 pp. 197–206.

D'Amore et al., One–Time Complete Indexing of Text: Theory and Practice, 1985, ACM, pp. 155–164.

Salton et al., Term–Weighting Approaches in Automatic Text Retrieval, 1988, Information Processing & Management vol. 24 No. 5 pp. 513–523.

Jung Soon Ro, An Evaluation of the Applicability of Ranking Algorithms to Improve the Effectiveness of Full–Text Retrieval, 1988, J. of Amer. Soc. for Info. Sc. 39(3), pp. 147–160.

Noreault et al. A Performance Evaluation of Similarity Measures, Document Term Weighting Schemes and Representations, NA Goolean Environment, 1981, Information Retrieval Research, pp. 57–76.

Sager et al., Classification of Ranking Algorithms, 1976 Int. Forum Inf. Doc., vol. 1, No. 4.

BYTE, v13, N5, "Searching for Text? Send an N–gram", R.E. Kimbrell, May 1988, pp. 297–312.

Primary Examiner—Robert A. Weinhardt
Attorney, Agent, or Firm—Robert D. Morelli; Thomas O. Maser

[57] ABSTRACT

Index terms are drawn from text documents without the need for language-specific processes or training and are suitable as gists for the subject documents. Index terms are extracted on the basis of scores of constituent n-grams relative to n-gram counts in a corpus. A method of extracting joint index terms to represent a plurality of documents is also provided.

14 Claims, 3 Drawing Sheets

LANGUAGE-INDEPENDENT METHOD OF GENERATING INDEX TERMS

CROSS-REFERENCE TO RELATED APPLICATIONS

This application is related to U.S. patent application Ser. No. 07/932,522, filed 20 Aug. 1992, now abandoned, entitled "METHOD OF IDENTIFYING, RETRIEVING, AND SORTING DOCUMENTS" and assigned to the assignee of the present application.

BACKGROUND OF THE INVENTION

This invention relates to the field of information retrieval, and more specifically to the field of automatic generation of index terms for text samples.

BRIEF DESCRIPTION OF THE PRIOR ART

For more than four decades, research in the automated processing of textual information has flourished. Much of that research has centered on information retrieval. Early workers in the newly-emerging field of information science recognized the value of having index terms to act as document surrogates for the purpose of selection. Moreover, computers of the time imposed severe limitations on processing memory, peripheral storage, and processing speed, making operation on the shorter proxies a necessity. It was quickly recognized that manual assignment of index terms would make processing in bulk impractical, and methods of machine assignment of index terms drawn from the text saw intense investigation. Vindication of that work has come in studies that show comparable—and sometimes superior—performance of automated over manual selection and assignment of index terms.

The explosion of machine-readable text and the desire for more general document sorting, indexing, perusal, and retrieval has maintained interest in automated generation of indexing terms. However, today's computers have made full-text searching a reality, and there is some evidence that machine retrieval based on index terms is losing user favor to full-text indexing, in part because of information overload, the deluge of documents netted by queries.

The large volume of documents returned from typical queries, either from full-text indexing, subject searching, or other means, argues for tools enabling easy selection and perusal of the returned documents. This is a point at which lists of automatically-generated index terms could be used to select among retrieved documents, particularly when dealing with data sets in which titles or abstracts are not guaranteed to exist. These lists of index terms may act as gists—abbreviated abstracts for user browsing and selection. While there are many other uses of index terms, the present invention has particular application to this problem.

The desire to operate over arbitrary languages and domains precludes the use of any syntactically-based systems, let alone those that employ semantic analysis. Moreover, many commonly-employed devices cannot be used for such broad application.

It is widely held that the selection of index terms should use a stemmer to reduce words which differ only by suffixes to the same root, thereby permitting such words to reinforce each other in scoring. Removing the suffixes also unifies the vocabulary, increasing the likelihood of matches for document comparison and reducing the number of redundant terms. Stemming algorithms are, of course, language- and domain-specific. Further, they miss other substring matches, such as the match of "earthquakes" with "quake."

Most approaches to assigning index terms employ a thesaurus to accomplish the same purposes as a stemmer, but for words that bear no resemblance. Certainly thesauri are impractical unless the domain of operation is constrained. Thesauri are obviously language-dependent.

Finally, most automatic indexing systems employ a stop-word list to cull the most common and uninformative words from documents—an action so routine that descriptions of indexing algorithms often fail to mention it. This operation is also language-specific. Moreover, a stop-word list may be domain-dependent, for if a corpus is limited to a single domain of a language, an appropriate stop-word list should include the words common throughout that domain.

Numerous methods for extracting index terms have been proposed. These require the use of one or more language-dependent components.

Counting of character n-grams has long been a component in information science methods. Such methods have been in the areas of storage compression, spelling error detection and correction, string searching, prediction, and information retrieval, including the use of n-grams as index terms. Other uses of n-gram counts in information retrieval have not attempted to extract index terms. Rather, the n-gram counts are used to measure the similarity between whole documents for language and topic sorting. An example of this use is disclosed in the Schmitt U.S. Pat. No. 5,062,143.

While the prior methods have been used satisfactorily, they have certain limitations which are overcome by the present invention wherein index terms are drawn from text documents without the need for language-specific processes or training.

SUMMARY OF THE INVENTION

Accordingly, it is a primary object of the present invention to provide a method for generating index terms from sample text relative to background text including the steps of filtering background text to remove undesired symbols, resulting in filtered background text; counting the n-grams in the filtered background text to produce background n-gram counts; filtering the sample text to remove undesired symbols, resulting in filtered sample text; counting the n-grams in the filtered sample text to produce sample n-gram counts; comparing the sample n-gram counts to the background n-gram counts to produce n-gram scores; assigning to each symbol of the filtered sample text a symbol score derived from the n-gram scores, the symbol score being derived from the scores of the n-grams containing the symbol; determining a symbol score threshold; and extracting as index terms the words and phrases of the filtered sample text that contain symbols whose symbol scores exceed the symbol score threshold.

BRIEF DESCRIPTION OF THE DRAWINGS

Other objects and advantages of the invention will become apparent from a study of the following specification when viewed in the light of the accompanying drawings, in which.

DETAILED DESCRIPTION

In accordance with the invention, a document under study is represented by a vector detailing the number of times an n-gram is observed. However, before processing a document to extract index terms, a background must be built. This background serves to characterize the average text in the corpus against which index terms will be formed. In practice, the background corpus usually contains the document under examination, though this is not mandatory. For purposes of this description, the background consists of the n-gram counts of the corpus treated as a single, long document. One background may then serve for extracting index terms for as many documents as desired. Note that the index terms are relative to the documents used to form the background; changing the breadth of the corpus serves to change the specificity of the index terms.

Figure 1:
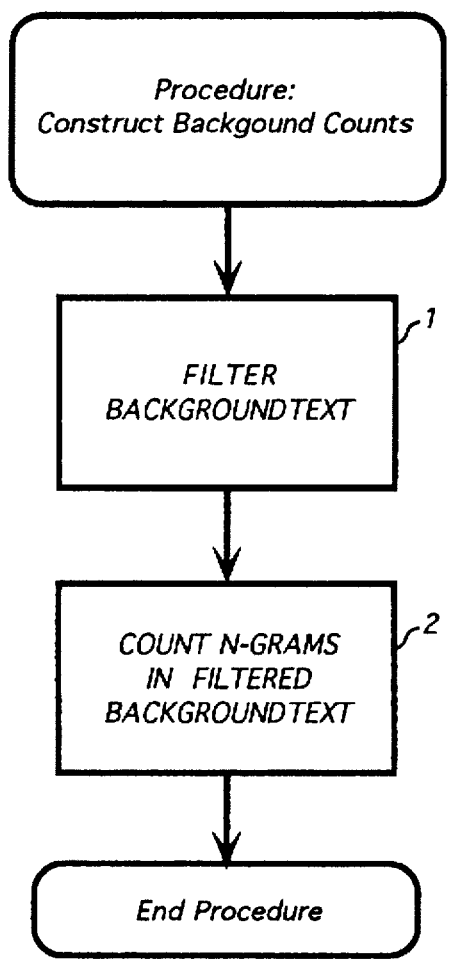
FIG. 1 is a flow chart illustrating the steps of a preferred embodiment of the method for constructing background n-gram counts.

FIG. 1 illustrates a preferred embodiment of the method for producing the background representation. In step 1, at the discretion of the user, the background text is filtered to remove unwanted characters, resulting in filtered background text. Typically, punctuation and numerals are replaced by stop characters flanked by blanks. (In later stages, n-grams containing stop characters are ignored, so that n-grams will not span sentences, etc.). Inserting a space on either side of the stop character assures that words appearing with adjacent punctuation will have the same context as those that do not. Formatting codes (such as carriage returns) may be treated in the same way or replaced by blanks. Following this, consecutive blanks are replaced by a single blank. In addition, case transformation is made, converting small letters to capitals. Filtering and transformation may be changed to accommodate other languages that use special codes for diacritics, use multiple bytes per character (such as Chinese and Japanese), or don't have different cases.

In step 2, exhaustive n-gram counts on the aforementioned filtered background text are accumulated, resulting in the background n-gram counts. The method of counting the background n-grams is identical to the method of sample n-gram counting, and is described below in step 12.

Figure 2:
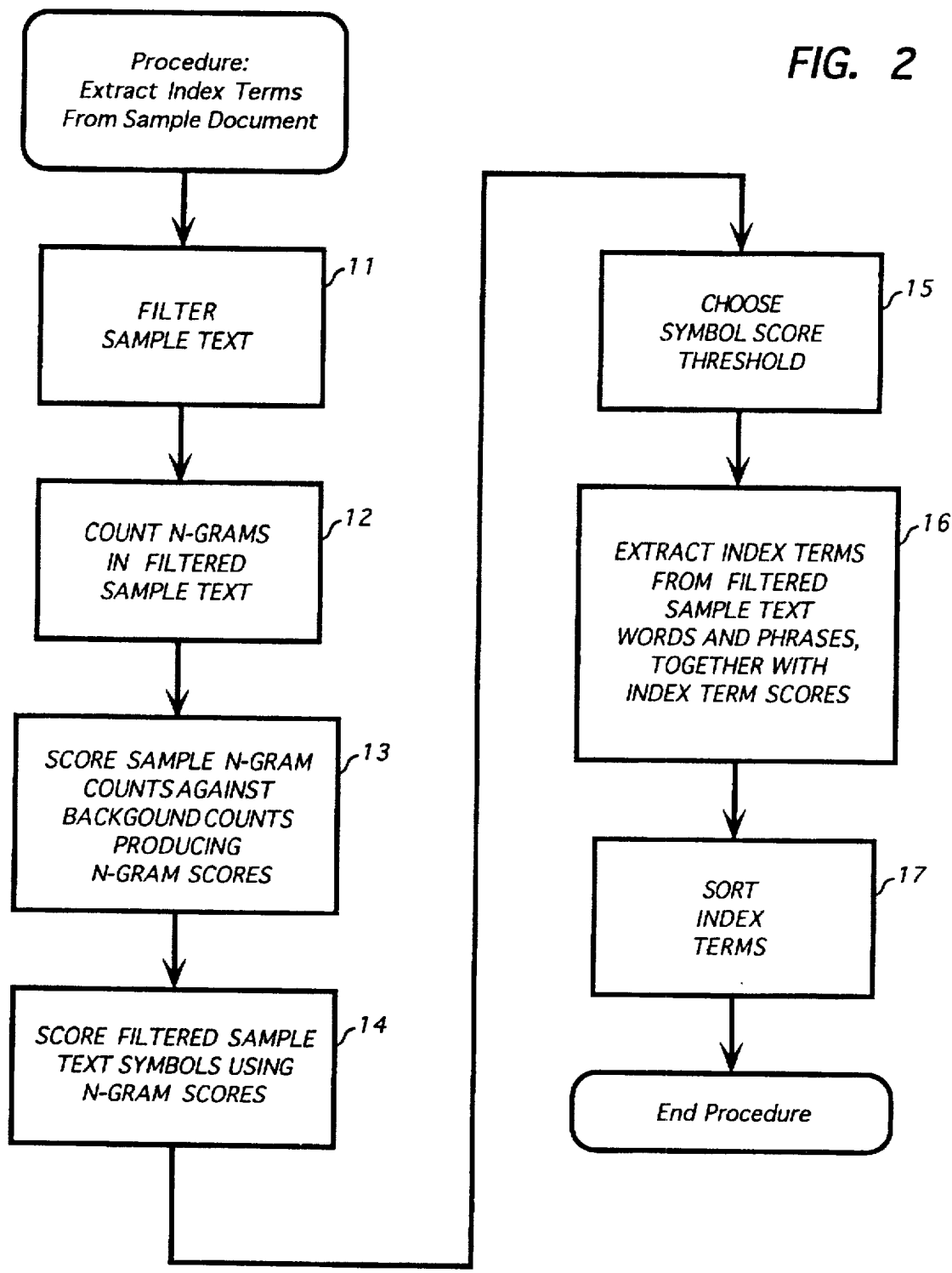
FIG. 2 is a flow chart illustrating the steps of a preferred embodiment of the method for extracting index terms from a sample document.

FIG. 2 illustrates the generation of index terms from a text sample. In step 11, at the discretion of the user, the sample text is filtered to remove unwanted characters, resulting in filtered sample text. Typically, punctuation and numerals are replaced by stop characters flanked by blanks. (In later stages, n-grams containing stop characters are ignored, so that n-grams will not span sentences, etc.). Inserting a space on either side of the stop character assures that words appearing with adjacent punctuation will have the same context as those that do not. Formatting codes (such as carriage returns) may be treated in the same way or replaced by blanks. Following this, consecutive blanks are replaced by a single blank. In addition, case transformation is made, converting small letters to capitals. Filtering and transformation may be changed to accommodate other languages that use special codes for diacritics, use multiple bytes per character (such as Chinese and Japanese), or do not have different cases.

Operating on the filtered sample text, step 12 forms sample n-gram counts as follows: Let the filtered sample text be of length S with symbols $s_1, s_2, \ldots, s_S$. Fixing the positive integer n, define the jth n-gram $g_j$ as the n-long subsequence of the text centered about the jth symbol:

$$g_j = (s_{j-(n-1)/2}, s_{j-(n-1)/2+1}, s_{j-(n-1)/2+n-1}).$$

(For even n, one may choose to round the subscripts either up or down, rounding in a consistent fashion.) In other words, an n-long window is slid along the text, and the pattern in the window is noted at each position of the window. The value of n typically ranges from 3 to 6, though it is not constrained to these values.

In practice, symbols $s_1, s_2, \ldots, s_S$ are bytes, rather than characters. The distinction only matters for multibyte characters. In this stage of the processing, the spectrum of n-grams is formed, recording each n-gram as it is observed by incrementing the appropriate count. If a stop character is found in the n-gram, the n-gram is not counted. While it appears that an alphabet of A possible symbols could produce $A^n$ distinct n-grams, normal text contains far fewer (English text tends to contain on the order of $10^5$ 5-grams—much smaller than the possible $27^5 = 1.4 \times 10^7$). For this reason, it is practical to accumulate the counts very quickly using a hash table, the preferred method. Using this method, an n-gram $g_j$ is mapped to a table address $\kappa(g_j)$ using some easily-computed hash function $\kappa$, which possesses pseudo-random properties including the mapping of all n-grams to a compact range of integers in a somewhat uniform fashion.

The n-gram counting step 2 of FIG. 1 operates in the same fashion on the background filtered text, accumulating the background n-gram counts.

Step 13 follows, and assigns n-gram scores to the sample n-gram counts by comparing them to respective background n-gram counts. These scores represent the novelty of the respective sample n-gram counts with respect to the background n-gram counts. The sample n-gram counts are denoted by the vector $C=(C_1, C_2, \ldots, C_N)$, where a representative count $C_i$, $i=1, 2, \ldots, N$, is the number of $\{g_j\}$ equal to the ith possible n-gram value. Similarly, let the background n-gram counts have corresponding denotation $B=(B_1, B_2, \ldots, B_N)$ with a total count of $R=\Sigma B_i$. A $G^2$ statistic for indicating the novelty of the ith n-gram is $$\Psi_i = \begin{cases} C_i \ln(C_i/S) + B_i \ln(B_i/R) - & SC_i \geq RB_i \\ (SC_i + RB_i)\ln[(SC_i + RB_i)/(S+R)], & \\ 0, & SC_i < RB_i \end{cases}$$

When computing $\Psi_i$, one defines x ln x evaluated at x=0 to be zero. The score vector $\Psi=(\Psi_1, \Psi_2, \ldots, \Psi_N)$ comprises the n-gram scores.

An alternative, chi-squared score is $$\chi_i^2 = (C_i - S\hat{t})^2 \left( \frac{1}{S\hat{t}} + \frac{1}{S(1-\hat{t})} \right) + (B_i - R\hat{t})^2 \left( \frac{1}{R\hat{t}} + \frac{1}{R(1-\hat{t})} \right)$$

$$\approx \frac{(C_i - S\hat{t})^2}{S\hat{t}} + \frac{(B_i - R\hat{t})^2}{R\hat{t}},$$

where $$\hat{t} = \frac{C_i + B_i}{S + R},$$

which may be substituted for the aforementioned $\Psi_i$, respectively.

From the n-gram scores, each symbol in the filtered text is now assigned a score in step 14. The preferred method of assigning symbol scores is to give the jth symbol the score of the n-gram $g_j$. Thus, each time an n-gram occurs in the filtered sample text, its score is vested only in the symbol in the center of n-gram. This means that a high-scoring n-gram will give its high score to only words containing the center of the n-gram. For larger n, one may choose to distribute the n-gram score over the symbols in the n-gram, perhaps giving more weight to those symbols nearer the center.

Note that assigning the symbol scores requires a second pass through the filtered sample text. During this pass, the n-long window is again passed along the text, each n-gram is hashed to get the address of the score for that n-gram, and the symbol scores are recorded in a vector Z of size equal to the filtered text length. When this pass is completed, the jth score in the symbol score vector will be $$z_j = \Psi(g_j),$$

where $\Psi(g)$ denotes the score for n-gram g. (Much of the work, namely the hashing, may be avoided the second time by keeping the hashed sample text from the first pass.)

The selection of words is based on selecting significantly-scoring symbols, which is, in turn, based on comparison to a symbol score threshold. Step 15 chooses the symbol score threshold, for which several methods are available. Static absolute thresholds may be used, as well as statistics based on the n-gram count scores. Preferred results are obtained by examining the symbol scores and selecting a threshold that is a given number of sample standard deviations above the mean in practice, the user prescribes a threshold of $\delta$ standard deviations. The score threshold $\tau$ is then set using the first two sample moments of the symbol scores:

$$\tau = m_1 + \delta m_2,$$

where $$m_1 = \frac{1}{S} \sum_{j=1}^{S} z_j \text{ and } m_2 = \sqrt{\frac{1}{S} \sum_{j=1}^{S} (z_j - m_1)^2}.$$

Typically, $\delta$ is chosen in the neighborhood of 2.

Next, in step 16, words and phrases from the filtered sample text are extracted based on the contained symbol scores and the symbol score threshold. A word is a string of consecutive symbols which is separated from the adjoining symbols by specified delimiters, usually spaces. The delimiters are not considered part of the word. (Other schemes of defining "words" are appropriate for languages that do not have such simple cues, as in Japanese. In the case of Japanese, nominal word separation is accomplished by dividing at the junctures of kanji, katakana, hiragana, and other characters.)

A word is recognized as significant if at least one of its symbols has a score equal to, or exceeding, the symbol score $\tau$. If a word is found to be significant, it is selected as an index term. Similarly, if a significant n-gram spans two words, then the combination of those words is significant. Two adjacent words are joined as a phrase, including the common delimiter, if the symbols on either side of the delimiter jointly contribute to a significantly scoring n-gram. This is determined by examining the symbol scores which resulted from n-grams that included both the delimiter and the symbols to either side of it. Any number of consecutive words may be joined in this fashion as a single index term.

Optionally, as part of step 16, an index term score may be calculated. The index term score is based on the number of times an index term is observed in the filtered sample text and on the scores of the index term's symbols at each instance. There are many appropriate methods for computing such a score. For each instance of the index term in the filtered sample text, define an index term instance score as the numerical average of the symbol scores of the symbols contained in the instance of the index term. A preferred index term score is the sum of the index term instance scores for that index term.

Finally, in step 17, the index terms may be sorted, either alphabetically, or by their index term scores, or by other criteria. The index terms may also be presented with their respective index term scores.

Joint index terms for a plurality of documents may be defined. These index terms, while differentiating the chosen plurality of documents from the background, are also index terms "common" to all chosen documents. The index terms apply to the whole plurality in the sense that the following conditions are satisfied: (A) the index terms apply to the document formed by concatenating the individual documents; but, (B) only n-grams which are significant to every document in the plurality are considered. The method of extracting joint index terms for a plurality of documents is similar to the method for a single document and augmented by several extra steps.

Before examining the sample documents, background counts must be accumulated from background text by the method described above and illustrated in FIG. 1.

Figure 3:
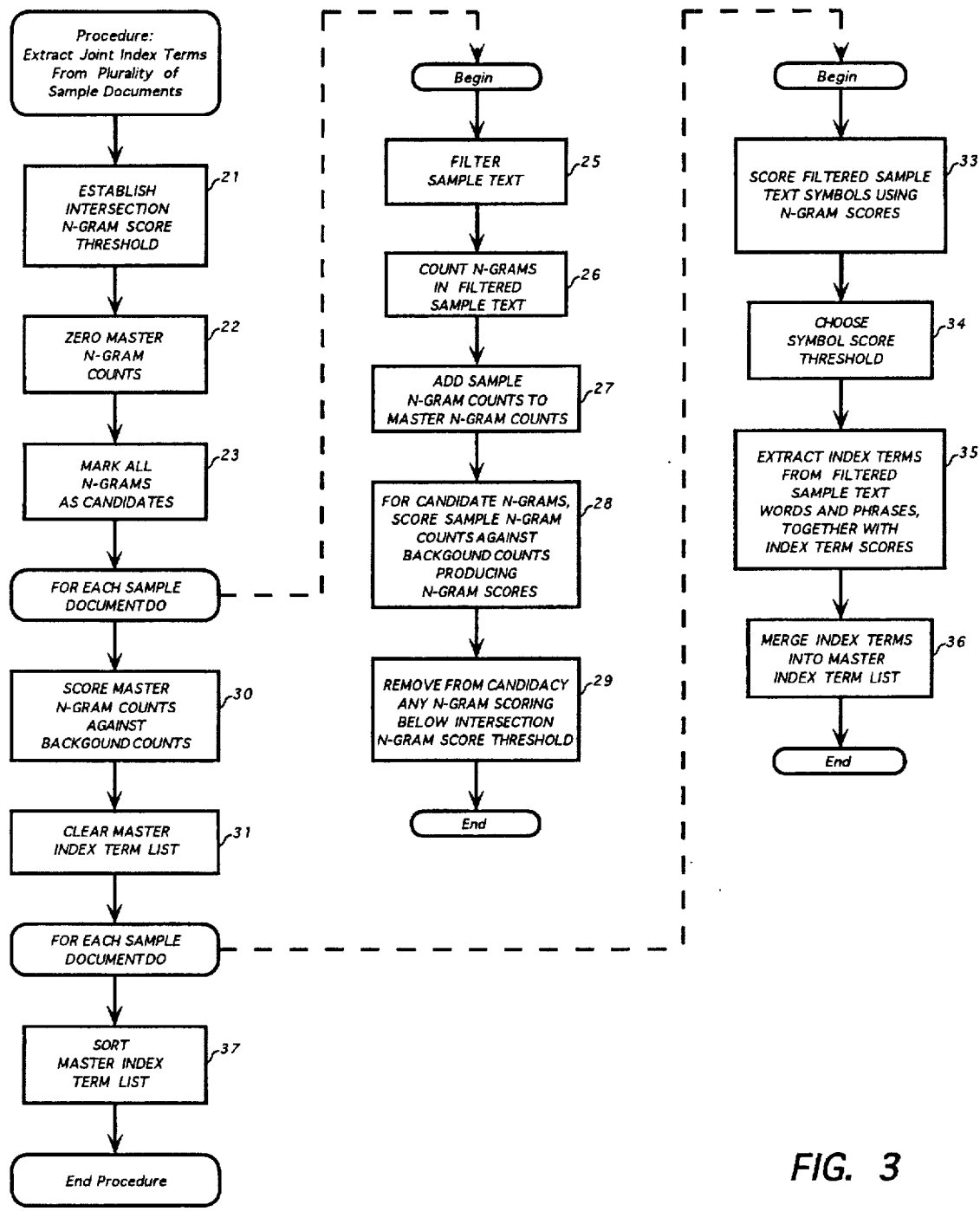
FIG. 3 is a flow chart illustrating the steps of a preferred embodiment of the method for extracting joint index terms from a plurality of sample documents.

The method for generating joint index terms for a plurality of documents is illustrated in FIG. 3.

Step 21 establishes an absolute intersection n-gram score threshold $\tau_0$, which is used for forming the intersection of significant n-grams. This preliminary threshold is generous enough to permit small contributions to pass, while rejecting scores that exhibit no novelty. The threshold may be specified as some number of standard deviations above the mean under the hypothesis that the n-gram count is drawn from the same distribution as the background. With the large sample approximation, this threshold is $$\tau_0 = \frac{1}{2} + \frac{\delta_0}{\sqrt{2}},$$

where $\tau_0$ specifies the desired number of standard deviations. In practice, the value of $$\delta_0 = \frac{2}{3},$$

is appropriate, that is, the intersection threshold, in standard deviations, is set to one third of the symbol score threshold in standard deviations.

As part of initialization, a master (cumulative) n-gram count table is zeroed (step 22). Further, all n-grams in the table are marked as candidates (step 23).

For each sample document in the plurality of sample documents, steps 25 through 29 are then performed. In step 25, the document is filtered, removing extraneous characters such as punctuation and numbers as in step 11 above. Next (step 26), the sample n-gram counts are formed, as in step 12 above, from the filtered sample text, resulting in the sample n-gram counts. In step 27, the sample n-gram counts are added to the master n-gram counts for later use. In the next step (step 28), for each n-gram that is still a candidate, its associated sample n-gram count is compared to the respective background n-gram count, resulting in a score, using the method described in step 13. Step 29 examines these scores for each candidate n-gram, and if the score falls below the intersection n-gram score threshold $\tau_0$, the n-gram is marked as not being a candidate.

In step 30, the master n-gram counts are now scored in a manner similar to step 13, but the candidacy of each n-gram is also considered: For each n-gram that is still a candidate, its master n-gram count is compared to the corresponding count in the background, resulting in a score which is recorded with that n-gram entry as in step 13 above. Each n-gram that is no longer a candidate is given a score of zero.

In preparation for generating joint index terms for the plurality of sample documents, step 31 clears the master index term list. This list will eventually hold the index terms.

Next, for each sample document in the plurality of sample documents, steps 33 through 36 are performed. They are as follows: In step 33, from the master n-gram scores calculated in step 30, each symbol in the filtered sample text is assigned a score using the method of step 14. Step 34 establishes a symbol score threshold according to the method of step 15. Next, in step 35, words and phrases from the filtered sample text are extracted as sample index terms, with their scores, based on the contained symbol scores and the symbol score threshold. This is done in accordance with the procedure described in step 16. In step 36, index terms extracted in step 35, together with their scores, are merged into the master index term list for all documents. Index term scores are added during merger.

The final step, step 37, sorts the master index term list in accordance with the procedure outlined in step 17.

The master n-gram scores are derived from the entire plurality of sample documents, but are nonzero only if they are judged to be significant for every document in the plurality. As more n-grams are removed from candidacy the processing becomes faster in steps 28 and 29.

In accordance with the invention, an efficient method for generating index terms from sample text is provided with the terms being suitable for a gist of the sample text. The method requires no training beyond observing the text background corpus and is independent of the language or domain of the sample text.

Although an exemplary embodiment of the invention has been disclosed for purposes of illustration, it will be understood by those skilled in the art that modifications may be incorporated into such embodiment without departing from the spirit of the invention. In particular, the disclosed logical steps may be merged, separated, or performed in parallel, may be accelerated by methods well known to those skilled in the art, and may be implemented in hardware, software, or a combination thereof; further, maintenance and initialization tasks have been neglected in this disclosure, these tasks being obvious to those skilled in the art.

What is claimed is:

1. A method of extracting index terms from sample text relative to background text, comprising the steps of
   (a) filtering the background text to remove undesired symbols, thereby to produce filtered background text;
   (b) counting the n-grams in said filtered background text to produce background n-gram counts;
   (c) filtering the sample text to remove undesired symbols, thereby to produce filtered sample text;
   (d) counting the n-grams in said filtered sample text to produce sample n-gram counts;
   (e) comparing said sample n-gram counts to said background n-gram counts to produce n-gram scores;
   (f) assigning to each symbol of said filtered sample text a symbol score derived from said n-gram scores, said symbol score being derived from the scores of the n-grams containing said symbol;
   (g) determining a symbol score threshold; and
   (h) extracting as index terms the words and phrases of said filtered sample text that contain symbols whose symbol scores exceed said symbol score threshold.

2. A method as defined in claim 1, wherein said sample n-gram counts and said background n-gram counts are produced by accumulating counts in hash tables.

3. A method as defined in claim 1, wherein said comparing step for each count includes computing the score $$(\chi_i)^2 = ((C_i - S\bar{t})^2((1/S\bar{t}) + (1/(S(1-\bar{t})))) +$$
$$((B_i - R\bar{t})^2((1/R\bar{t}) + (1/(R(1-\bar{t})))) \approx$$
$$((C_i - S\bar{t})^2/S\bar{t}) + ((B_i - R\bar{t})^2/R\bar{t}),$$

where $C_i$ is the sample n-gram count being compared, where $B_i$ is the corresponding background n-gram count, where S is the sample size, where R is the background size, and where $\bar{t}=(C_i+B_i)/(S+R)$.

4. A method as defined in claim 1, wherein said assigning step comprises assigning to each symbol of the sample text the n-gram score of the n-gram centered on said symbol.

5. A method as defined in claim 1, wherein said extracting step includes extracting as index terms phrases of the sample text by extracting consecutive words and their joining delimiter when said delimiter or a symbol adjacent to said delimiter has a symbol score which exceeds said symbol score threshold.

6. A method as defined in claim 1, wherein said extracting step includes:
   (a) assigning to each of said index terms an index term score derived from the frequency of said index term in said sample text and the symbol scores of the symbols contained in said index term; and
   (b) sorting said index terms according to said index term scores.

7. A method of extracting joint index terms from a plurality of sample texts relative to background text, comprising:
   (a) filtering the background text to remove undesired symbols, thereby to produce filtered background text;
   (b) counting the n-grams in said filtered background text to produce background n-gram counts;
   (c) selecting an intersection score threshold;
   (d) marking all n-grams as candidates;
   (e) clearing master n-gram counts;
   (f) for each sample text of the plurality of sample texts, performing the steps of:
      (i) filtering the sample text to remove undesired symbols, thereby to produce filtered sample text;
      (ii) counting the n-grams in said filtered sample text to produce sample n-gram counts;
      (iii) adding said sample n-gram counts to the master n-gram counts;
      (iv) for each sample n-gram that is still a candidate, comparing said sample n-gram count to the corresponding background n-gram count to produce an n-gram score; and
      (v) marking all n-grams whose scores are below said intersection score threshold as no longer being candidates;
   (g) for each n-gram that is still a candidate, comparing its master n-gram count to the corresponding background n-gram count to produce a master n-gram score, and for each n-gram that is not still a candidate, assigning a master n-gram score of zero; and
   (h) for each sample text of the plurality of sample texts, performing the steps of:
      (i) assigning to each symbol of said filtered sample text a symbol score derived from said n-gram scores, said symbol score being derived from the master n-gram scores of the n-grams containing said symbol;

(ii) determining a symbol score threshold; and (iii) extracting as index terms the words and phrases of said filtered sample text that contain symbols whose symbol scores exceed said symbol score threshold.

8. A method as defined in claim 7, wherein the steps of producing said sample n-gram counts and said background n-gram counts are performed by accumulating counts in hash tables.

9. A method as defined in claim 7, wherein said step of comparing said sample n-gram counts to said background n-gram counts to produce n-gram scores, for each count, includes computing the score $$(\chi_i)^2 = ((C_i - S\bar{t})^2((1/S\bar{t}) + (1/(S(1-\bar{t})))) +$$
$$((B_i - R\bar{t})^2((1/R\bar{t}) + (1/(R(1-\bar{t})))) \approx$$
$$((C_i - S\bar{t})^2/S\bar{t}) + ((B_i - R\bar{t})^2/R\bar{t}),$$

where $C_i$ is the sample n-gram count being compared, $B_i$ is the corresponding background n-gram count, S is the sample size, and R is the background size, and where $\bar{t}=(C_i+B_i)/(S+R)$.

10. A method as defined in claim 7, wherein said assigning step comprises assigning to each symbol of the sample text the n-gram score of the n-gram centered on said symbol.

11. A method as defined in claim 7, wherein said extracting step includes extracting as index terms phrases of said sample text by extracting consecutive words and their joining delimiter when said delimiter or a symbol adjacent to said delimiter has a symbol score which exceeds said symbol score threshold.

12. A method as defined in claim 7, wherein said extracting step includes:

(a) assigning to each of said index terms an index term score derived from the frequency of said index term in said sample text and the symbol scores of the symbols contained in said index term; and (b) sorting said index terms according to said index term scores.

13. A method of extracting index terms from sample text relative to background text, comprising the steps of:

a) filtering the background text to remove undesired symbols, thereby to produce filtered background text;

b) counting the n-grams in said filtered background text to produce background n-gram counts;

c) filtering the sample text to remove undesired symbols, thereby to produce filtered sample text;

d) counting the n-grams in said filtered sample text to produce sample n-gram counts, wherein said sample n-gram counts and said background n-gram counts are produced by accumulating counts in hash tables;

e) comparing said sample n-gram counts to said background n-gram counts to produce n-gram scores, wherein said comparing step for each count includes computing the score:

$$(\chi_i)^2 = ((C_i - S\bar{t})^2((1/S\bar{t}) + (1/(S(1-\bar{t})))) +$$
$$((B_i - R\bar{t})^2((1/R\bar{t}) + (1/(R(1-\bar{t})))) \approx$$
$$((C_i - S\bar{t})^2/S\bar{t}) + ((B_i - R\bar{t})^2/R\bar{t}),$$

where $C_i$ is the sample n-gram count being compared, $B_i$ is the corresponding background n-gram count, S is the sample size, and R is the background size, and where $\bar{t}=(C_i+B_i)/(S+R)$;

f) assigning to each symbol of said filtered sample text a symbol score derived from said n-gram scores, said symbol score being derived from the scores of the n-grams containing said symbol;

g) determining a symbol score threshold; and h) extracting as index terms the words and phrases of said filtered sample text that contain symbols whose symbol scores exceed said symbol score threshold.

14. A method of extracting joint index terms from a plurality of sample texts relative to background text, comprising the steps of:

a) filtering the background text to remove undesired symbols, thereby to produce filtered background text;

b) counting the n-grams in said filtered background text to produce background n-gram counts;

c) selecting an intersection score threshold;

d) marking all n-grams as candidates;

e) clearing master n-gram counts;

f) for each sample text of the plurality of sample texts, performing the steps of:

i) filtering the sample text to remove undesired symbols, thereby to produce filtered sample text;

ii) counting the n-grams in said filtered sample text to produce sample n-gram counts, wherein said sample n-gram counts and said background n-gram counts are produced by accumulating counts in hash tables;

iii) adding said sample n-gram counts to the master n-gram counts;

iv) for each sample n-gram that is still a candidate, comparing said sample n-gram count to the corresponding background n-gram count to produce an n-gram score, wherein said step of comparing said sample n-gram counts to said background n-gram counts to produce n-gram scores, for each count, includes computing the score:

$$(\chi_i)^2 = ((C_i - S\bar{t})^2((1/S\bar{t}) + (1/(S(1-\bar{t})))) +$$
$$((B_i - R\bar{t})^2((1/R\bar{t}) + (1/(R(1-\bar{t})))) \approx$$
$$((C_i - S\bar{t})^2/S\bar{t}) + ((B_i - R\bar{t})^2/R\bar{t}),$$

where $C_i$ is the sample n-gram count being compared, B is the corresponding background n-gram count, S is the sample size, and R is the background size, and where $\bar{t}=(C_i+B_i)/(S+R)$; and v) marking all n-grams whose scores are below said intersection score threshold as no longer being candidates;

g) for each n-gram that is still a candidate, comparing its master n-gram count to the corresponding background n-gram count to produce a master n-gram score, and for each n-gram that is not still a candidate, assigning a master n-gram score of zero; and h) for each sample text of the plurality of sample texts, performing the steps of:

i) assigning to each symbol of said filtered sample text a symbol score derived from said n-gram scores, said symbol score being derived from the master n-gram scores of the n-grams containing said symbol;

ii) determining a symbol score threshold; and iii) extracting as index terms the words and phrases of said filtered sample text that contain symbols whose symbol scores exceed said symbol score threshold.

* * * * *